(12) United States Patent
Narasimhan et al.

(10) Patent No.: US 10,869,053 B2
(45) Date of Patent: *Dec. 15, 2020

(54) SIGNALING HIGH DYNAMIC RANGE AND WIDE COLOR GAMUT CONTENT IN TRANSPORT STREAMS

(71) Applicant: ARRIS Enterprises LLC, Suwanee, GA (US)

(72) Inventors: Mandayam Narasimhan, San Diego, CA (US); Ajay Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,832

(22) Filed: Aug. 22, 2019

(65) Prior Publication Data

US 2019/0379898 A1    Dec. 12, 2019

Related U.S. Application Data

(63) Continuation of application No. 15/274,682, filed on Sep. 23, 2016, now Pat. No. 10,432,959.

(60) Provisional application No. 62/336,148, filed on May 13, 2016, provisional application No. 62/222,381, filed on Sep. 23, 2015.

(51) Int. Cl.
*H04N 19/463* (2014.01)
*H04N 19/186* (2014.01)
*H04N 19/187* (2014.01)
*H04N 19/30* (2014.01)
*H04N 19/70* (2014.01)
(Continued)

(52) U.S. Cl.
CPC ......... *H04N 19/463* (2014.11); *H04N 19/186* (2014.11); *H04N 19/187* (2014.11); *H04N 19/30* (2014.11); *H04N 19/70* (2014.11); *H04N 21/2353* (2013.01); *H04N 21/234327* (2013.01)

(58) Field of Classification Search
CPC .... H04N 19/463; H04N 19/184; H04N 19/98; H04N 19/85
USPC .................................................... 375/240.08
See application file for complete search history.

(56) References Cited

U.S. PATENT DOCUMENTS

2016/0295220 A1* 10/2016 Oh ................. H04N 21/234327

FOREIGN PATENT DOCUMENTS

| WO | 2014/002901 A1 | 1/2014 |
| WO | 2014/203747 A1 | 12/2014 |

(Continued)

OTHER PUBLICATIONS

Ajay Luthra et al: "Draft Requirements and Explorations for HDR/WCG Content Distribution and Storage", 109. MPEG Meeting;Jul. 7, 2014-Nov. 7, 2014; SAPPORO; (Motion Picture Expert Group or ISO/IEC JTC1/SC29/WG11) (Year: 2014).*

(Continued)

*Primary Examiner* — On S Mung
(74) *Attorney, Agent, or Firm* — Chernoff, Vilhauer, McClung & Stenzel, LLP

(57) ABSTRACT

A program map table in a transport stream comprising an elementary stream identifier indicating a particular elementary stream, a high dynamic range flag indicating the presence or absence of high dynamic range content within the elementary stream, and a wide color gamut flag indicating the presence or absence of wide color gamut content within the elementary stream.

11 Claims, 4 Drawing Sheets

(51) Int. Cl.
*H04N 21/2343* (2011.01)
*H04N 21/235* (2011.01)

(56) References Cited

FOREIGN PATENT DOCUMENTS

| | | |
|---|---|---|
| WO | 2015/008987 A1 | 1/2015 |
| WO | 2015/065037 A1 | 5/2015 |
| WO | 2015/076616 A1 | 5/2015 |
| WO | 2015065037 A1 | 5/2015 |

OTHER PUBLICATIONS

Office Action RE: Japanese Application No. 2018-515282 (English Translation) Nov. 19, 2019.
English Translation of Chinese Office Action re Application No. 201680056523.5.

\* cited by examiner

| Syntax | Number of Bits | Data Type |
|---|---|---|
| HEVC_descriptor() { | | |
|     descriptor_tag | 8 | Unsigned Integer |
|     descriptor_length | 8 | Unsigned Integer |
|     profile_space | 2 | Unsigned Integer |
|     tier_flag | 1 | Bit String |
|     profile_idc | 5 | Unsigned Integer |
|     profile_compatibility_indication | 32 | Bit String |
|     progressive_source_flag | 1 | Bit String |
|     interlaced_source_flag | 1 | Bit String |
|     non_packed_constraint_flag | 1 | Bit String |
|     frame_only_constraint_flag | 1 | Bit String |
|     reserved_zero_44bits | 44 | Bit String |
|     level_idc | 8 | Unsigned Integer |
|     temporal_layer_subset_flag | 1 | Bit String |
|     HEVC_still_present_flag | 1 | Bit String |
|     HEVC_24hr_picture_present_flag | 1 | Bit String |
|     sub_pic_hrd_params_not_present_flag | 1 | Bit String |
|     WCG_video_not_present_flag | 1 | Bit String |
|     HDR_video_not_present_flag | 1 | Bit String |
|     reserved | 2 | Bit String |
|     if ( temporal_layer_subset_flag == '1') { | | |
|         temporal_id_min | 3 | Unsigned Integer |
|         reserved | 5 | Bit String |
|         temporal_id_max | 3 | Unsigned Integer |
|         reserved | 5 | Bit String |
|     } | | |
| } | | |

WCG Flag 212

HDR Flag 210

FIG. 4

SIGNALING HIGH DYNAMIC RANGE AND WIDE COLOR GAMUT CONTENT IN TRANSPORT STREAMS

CLAIM OF PRIORITY

The present application is a continuation of U.S. Pat. No. 10,432,959 issued on Oct. 1, 2019, and claims priority under 35 U.S.C. § 119(e) from earlier filed U.S. Provisional Application Ser. No. 62/222,381, filed Sep. 23, 2015, and from earlier filed U.S. Provisional Application Ser. No. 62/336,148, filed May 13, 2016, both of which are hereby incorporated by reference.

TECHNICAL FIELD

The present disclosure relates to the field of digital video, particularly a method of signaling the presence of high dynamic range (HDR) and/or wide color gamut (WCG) content in a transport stream.

BACKGROUND

Video sequences with color values in a High Dynamic Range (HDR) video and/or Wide Color Gamut (WCG) offer greater ranges of luminance and color values than traditional video with color values in a standard dynamic range (SDR) and/or a standard color gamut (SCG). For example, traditional SDR video can have a limited luminance and color range, such that details in shadows or highlights can be lost when images are captured, encoded, and/or displayed. In contrast, HDR video can capture a broader range of luminance and color information, allowing the video to appear more natural and closer to real life to the human eye.

However, while HDR/WCG video can look more natural than traditional SDR/SCG video, many displays and/or decoders do not yet support HDR/WCG video. For those that do, encoders can indicate information within the encoded bitstream about pre-processing operations they performed in order to encode HDR/WCG content, such that decoders can decode the bitstream and examine the decoded information to determine how to perform corresponding post-processing operations on the decoded values to reconstruct the HDR/WCG content.

However, improved techniques for identifying the presence of HDR/WCG video in a bitstream and more efficient decoding of such video is desired.

SUMMARY

The present disclosure provides a program map table for a transport stream, the program map table comprising an elementary stream identifier indicating a particular elementary stream within the transport stream, a high dynamic range flag indicating the presence or absence of high dynamic range content within the elementary stream, and a wide color gamut flag indicating the presence or absence of wide color gamut content within the elementary stream.

The present disclosure also provides method of encoding a digital video, the method comprising receiving a video with high dynamic range content and wide color gamut content at an encoder, converting the high dynamic range content and wide color gamut content prior to encoding using one or more pre-processing operations at the encoder, encoding the video into an elementary stream at the encoder, generating a program map table comprising a high dynamic range flag and a wide color gamut flag, the high dynamic range flag indicating the presence of the high dynamic range content in the elementary stream and the wide color gamut flag indicating the presence of the wide color gamut content in the elementary stream, and including the program map table and the elementary stream in a transport stream.

The present disclosure also provides a method of decoding a video, the method comprising receiving at a decoder a transport stream comprising a program map table and an associated elementary stream, reviewing the program map table at the decoder for a high dynamic range flag and a wide color gamut flag, and decoding the elementary stream when the high dynamic range flag and the wide color gamut flag indicate that the elementary stream contains high dynamic range and wide color gamut content and the decoder is configured to process high dynamic range and wide color gamut content.

BRIEF DESCRIPTION OF THE DRAWINGS

Further details of the present invention are explained with the help of the attached drawings in which:

FIG. 4 depicts a non-limiting example of syntax for an HEVC video descriptor comprising an HDR flag and a WCG flag.

DETAILED DESCRIPTION

Figure 1:
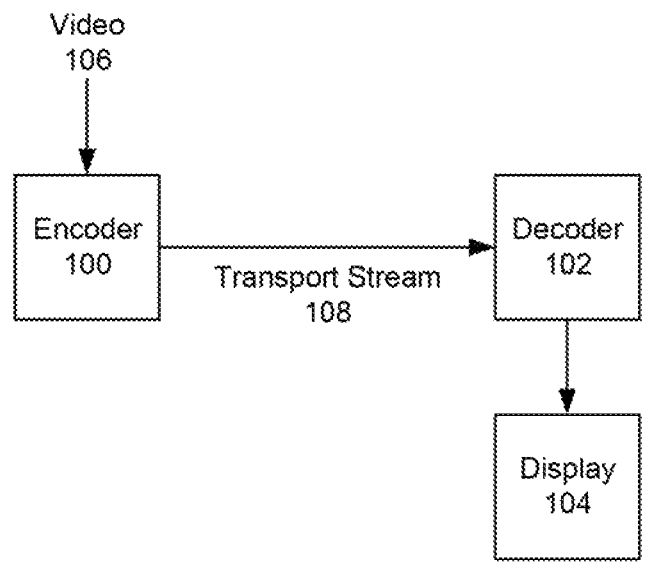
FIG. 1 depicts an embodiment of a video system comprising an encoder and a decoder coupled with a display.

FIG. 1 depicts an embodiment of a video system comprising an encoder 100 and a decoder 102 coupled with a display 104.

An encoder 100 can comprise processors, memory, circuits, and/or other hardware and software elements configured to encode, transcode, and/or compress video data into a bitstream, while a decoder 102 can similarly comprise processors, memory, circuits, and/or other hardware and software elements configured to decode, transcode, and/or decompress a bitstream into reconstructed video data. The encoder 100 and decoder 102 can respectively encode and decode video data according to a video coding format and/or compression scheme, such as HEVC (High Efficiency Video Coding) or H.264/MPEG-4 AVC (Advanced Video Coding). By way of a non-limiting example, in some embodiments the encoder 100 and decoder 102 can use the Main 10 HEVC profile.

In some embodiments, the encoder 100 and/or decoder 102 can be dedicated hardware devices. In other embodiments the encoder 100 and/or decoder 102 can be, or use, software programs running on other hardware such as servers, computers, or video processing devices. By way of a non-limiting example, an encoder 100 can be a video encoder operated by a video service provider, while a decoder 102 can be part of a receiver or set top box, such as a cable box, connected to a television or other display 104. In some embodiments, a decoder 102 and display 104 can be integrated into a single device.

As shown in FIG. 1, the encoder 100 can encode a received video 106 into a bitstream and package the encoded bitstream into a transport stream 108. By way of a non-limiting example, the transport stream 108 can be an MPEG-2 transport stream. The transport stream 108 can be provided to a decoder 102 over the interne, over a digital cable television connection such as Quadrature Amplitude Modulation (QAM), or over any other digital transmission or delivery mechanism. A decoder 102 can extract encoded bitstreams from the transport stream 108 and decode them to output a reconstructed version of the video 106 for playback on the display 104. The display 104 can be a television, monitor, device screen, or any other type of display configured to present reconstructed video 106.

In some situations or embodiments a video 106 can contain high dynamic range (HDR) and/or wide color gamut (WCG) content. HDR/WCG video can have luminance and chromaticity values expressed in a greater range than video with values in a standard dynamic range (SDR) and/or standard color gamut (SCG).

However, many displays 104 and/or decoders 102 do not yet support HDR/WCG video 106. HDR content can have a higher ratio of maximum visible brightness to minimum visible brightness compared to SDR content. While an HDR display 104 can generally process and display SDR content, some decoders 102 and/or SDR displays 104 are not configured to convert HDR values into a smaller dynamic range for playback on SDR displays 104. By way of a non-limiting example, in some embodiments an SDR display 104 can be configured to reproduce luminance values up to 100 nits (candelas per square meter) as defined by Recommendation ITU-R BT.2035 Section 3.2, while in some embodiments an HDR display 104 can reproduce luminance values up to 1000 nits or greater. Recommendation ITU-R BT.2035 is hereby incorporated by reference. Similarly, while a WCG display 104 can generally process and display SCG content, some decoders 102 and/or SCG displays 104 are not configured to convert WCG values into a narrower color gamut for playback on SCG displays 104. By way of another non-limiting example, in some embodiments an SDR display 104 can reproduce chromaticity values in a standard color gamut defined by Recommendation ITU-R BT.709, while in some embodiments an HDR display 104 can reproduce chromaticity values in a wide color gamut defined by Recommendation ITU-R BT.2020. Recommendation ITU-R BT.709 and Recommendation ITU-R BT.2020 are hereby incorporated by reference.

In some embodiments a scalable video compression scheme, such as Scalable HEVC (SHVC), can be used to encode information about a SDR/SCG version of a video 106 in a base layer while information that can be used to convert SDR/SCG values in the base layer into HDR/WCG values can be encoded in a separate non-base enhancement layer. As such, decoders 102 that are set to output video 106 to an SDR/SCG display 104 can ignore the enhancement layer and just decode information the base layer to reconstruct an SDR/SCG version of the video 106. Similarly, decoders 102 that are set to output video 106 to an HDR/WCG display 104 can decode SDR/SCG values from the base layer and use information in the HDR/WCG enhancement layer to convert the decoded SDR/SCG values to HDR/WCG values. In some situations, SDR/SCG content encoded in an existing base layer can be enhanced with a new enhancement layer that indicates how to convert the existing SDR/SCG values to HDR/WCG values.

In some embodiments scalable video coding bitstreams, such as SHVC bitstreams, can include video descriptors that indicate the presence of HDR/WCG content in an enhancement layer and/or buffer parameters for that layer, hierarchy descriptors that indicate a layer assembly hierarchy for SDR/SCG base layer and HDR/WCG enhancement layers, and/or operation point descriptors that indicate decoder resources for decoding and/or rendering HDR/WCG content. However, these descriptors are generally encoded within the bitstream itself. As such, a decoder 102 may need to spend time and processing resources to begin decoding the bitstream before it can determine from the descriptors whether or not it can use the enhancement layer. Additionally, many decoders 102 do not support scalable video coding such as SHVC.

In other embodiments, a non-scalable encoding scheme can be used in which HDR/WCG video can be encoded into a standard non-scalable bitstream. Although many non-scalable coding schemes were originally developed for SDR/SCG video that has values represented with 8 or 10 bits, when HDR/WCG video is provided in a higher bit depth format, such as having color values represented with 16 bits, encoders 100 can perform various pre-processing operations to convert HDR/WCG 16 bit values into 10 or 8 bit values that can be encoded using non-scalable coding schemes such as HEVC. Decoders 102 can thus decode the 10 or 8 bit values and then perform post-processing operations that reverse the encoder's pre-processing operations to reconstruct HDR/WCG values. Accordingly, decoders 102 can use the same basic decoding steps for both HDR/WCG and SDR/SCG bitstreams without a change to decompression, but then use post-processing operations if needed to reconstruct HDR/WCG values. In some situations deployed decoders 102 can be upgraded with new firmware to perform new post-processing steps to reconstruct HDR/WCG values, however deployed decoders 102 that have not been upgraded can still decode the bitstream using a known 10 or 8 bit profile. In some embodiments or situations the encoder's pre-processing steps can convert HDR/WCG content into SDR/SCG content prior to encoding, such that SDR/SCG decoders 102 can directly present decoded values on SDR/SCG displays 104 without pre-processing steps.

In such systems encoders 100 can indicate information about the pre-processing operations they performed within the encoded bitstream, such that decoders 102 can decode the bitstream and examine it to determine how to perform corresponding post-processing operations on decoded values. For example, information about pre-processing operations can be included within a bitstream in supplemental enhancement information (SEI), in video usability information (VUI), and/or other elements of the bitstream.

However, while including information about pre-processing operations in a bitstream can allow a decoder 102 to determine which post-processing operations may be necessary and/or how to perform them, when such information is included only within the bitstream a decoder 102 must first decode the bitstream before reviewing that information and determining whether or not it is not able to perform the post-processing operations indicated by the decoded bitstream.

As such, in some scenarios a decoder 102 can waste time and resources decoding a bitstream before determining that it cannot process the decoded values for display. For example, a bitstream for HDR/WCG video can be encoded with the expectation that a decoder 102 will perform post-processing operations to convert decoded values into a substantial reconstruction of original HDR/WCG values. The bitstream can be encoded with information about the pre-processing operations performed by the encoder 100.

While a decoder 102 that outputs to an HDR/WCG display 104 can decode the bitstream and use that information to reconstruct HDR/WCG video for the display 104, a decoder 102 for an SDR/SCG display 104 or a decoder 102 that has not been configured to perform post-processing operations can waste time and resources decoding the bitstream before identifying the incompatibility from information encoded within the bitstream. By way of a non-limiting example, encoders 100 can perform pre-processing operations to encode HDR/WCG video into a bitstream using an MPEG Main 10 profile, and then signal transfer functions and other information it used within SEI messages and VUI for HDR content and signal BT.2020 color information in VUI for WCG content. As such, all Main 10 profile decoders 102 can decode the bitstream without changing decompression methods, but not all decoders 102 may be able to perform the appropriate post-processing steps to make the video presentable on a non-HDR or non-WCG display 104.

Disclosed herein are techniques for determining whether a bitstream contains HDR and/or WCG content without decoding the bitstream, such that a decoder 102 can determine up front whether or not it should devote resources to decoding the bitstream based on its own capabilities and/or the capabilities of a connected display 104. In many applications that use MPEG-2 transport streams, such as broadcast applications, signaling the presence of HDR and/or WCG content and/or other information at the program level outside the bitstream can allow HDR/WCG capable decoders 102 and displays 104 to determine that the bitstream contains HDR/WCG content so they can render decoded content correctly, while decoders 102 and displays 104 that do not have the capability to process or display HDR/WCG content can either ignore the content or attempt to convert it to SDR/SCG content for display.

Figure 2:
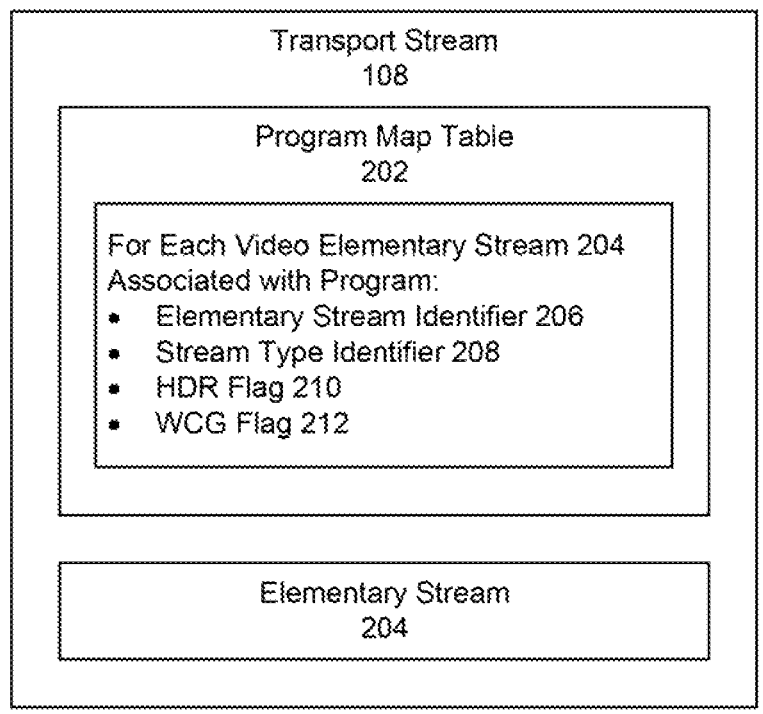
FIG. 2 is a block diagram depicting components of a transport stream.

FIG. 2 is a block diagram depicting components of a transport stream 108. In some embodiments a transport stream 108 can comprise data for a single program, such as a single video 106, while in other embodiments a transport stream 108 can comprise data for multiple programs multiplexed together. For each program in the transport stream 108, the transport stream 108 can comprise a program map table 202 and one or more elementary streams 204 associated with the program. The transport stream 108 can also comprise a program association table that identifies all of the program map tables 202 in the transport stream 108, such as a program map table 202 for each of a plurality of programs in a multiplexed transport stream 108.

An elementary stream 204 can be an encoded bitstream generated by an encoder 100 from a video 106, such as an encoded bitstream representing the video's visual components or audio components. By way of a non-limiting example, an elementary stream 204 can be an HEVC bitstream. An elementary stream 204 can comprise a series of packets that contain coded representations of video data and/or other information about the video 106, such as how it was encoded. The packets can be referred to as Packetized Elementary Stream (PES) packets. A single elementary stream 204 can be carried in a sequence of PES packets. In some embodiments the packets of an elementary stream 204 can be NAL (Network Abstraction Layer) units.

A program map table 202 in the transport stream 108 can provide mappings, referred to as "program definitions," between program numbers and program elements in the transport stream that comprise them, such that the program map tables 202 are a complete collection of all program definitions for a transport stream 108. In particular, one or more elementary streams 204 can be associated with the same program on a program map table 202. By way of a non-limiting example, a program map table 202 can identify an elementary stream 204 for a program's video components and another elementary stream 204 for the program's audio components, such that a decoder 102 can decode both elementary streams 204 to play back the video and audio components of the program.

A program map table 202 can list an elementary stream identifier 206 for each elementary stream 204 associated with the same program. In some embodiments an elementary stream identifier 206 can be a packet identifier (PID). In these embodiments, all packets in the transport stream 108 that are part of the same elementary stream share the same PID value. In embodiments in which the transport stream 108 is an MPEG-2 transport stream, the elementary stream identifier 206 can be an "elementary PID" value, a 13-bit field that specifies the PID of transport stream packets which carry the associated elementary stream.

A program map table 202 can also list a stream type identifier 208 for each elementary stream 204 associated with the same program. The stream type identifier 208 can indicate the coding scheme used to encode the elementary stream 204. In embodiments in which the transport stream 108 is an MPEG-2 transport stream, the stream type identifier 208 can be a "stream_type" value. By way of a non-limiting example, when the elementary stream 204 is an HEVC bitstream, the "stream type" value associated with the elementary stream 204 can be set to 0x24 in the program map table 202.

For each video elementary stream 204 identified in a program map table 202, the program map table 202 can also comprise a High Dynamic Range (HDR) flag 210 and/or a Wide Color Gamut (WCG) flag 212.

The HDR flag 210 can indicate whether or not the content of the elementary stream 204, when decoded, would have color values in a high dynamic range (HDR) or a standard dynamic range (SDR). A decoder 102 can thus use the HDR flag 210 to determine whether it should or should not attempt to decode and process the associated elementary stream 204, based on its own capabilities and/or the capabilities of a connected display 104.

In some embodiments the HDR flag 210 can have a Boolean data type, such that a value of 0 indicates that the elementary stream 204 has HDR content and a value of 1 does not indicate the presence of HDR content. In other embodiments the HDR flag 210 can have a Boolean data type, such that a value of 1 indicates that the elementary stream 204 has HDR content and a value of 0 does not indicate the presence of HDR content. In still other embodiments, the HDR flag 210 can have any other data type, such as an integer value or string that indicates the presence or absence of HDR content in the elementary stream 204.

The WCG flag 212 can indicate whether or not the content of the elementary stream 204, when decoded, would have color values in a wide color gamut (WCG) or standard color gamut (SCG). A decoder 102 can thus use the WCG flag 212 to determine whether it should or should not attempt to decode and process the associated elementary stream 204, based on its own capabilities and/or the capabilities of a connected display 104.

In some embodiments the WCG flag 212 can have a Boolean data type, such that a value of 0 indicates that the elementary stream 204 has WCG content and a value of 1 does not indicate the presence of WCG content. In other embodiments the WCG flag 212 can have a Boolean data type, such that a value of 1 indicates that the elementary stream 204 has WCG content and a value of 0 does not indicate the presence of WCG content. In still other embodiments, the WCG flag 212 can have any other data type, such as an integer value or string that indicates the presence or absence of WCG content in the elementary stream 204.

While the HDR flag 210 and WCG flag 212 are described separately herein, in alternate embodiments the two flags can be combined into a single element, such as a flag or data field, that indicates the presence or absence of both HDR and WCG content in an elementary stream 204.

An HDR flag 210 and/or WCG flag 212 associated with an elementary stream 204 in a program map table 202 can thus allow a decoder 102 to determine whether or not it should decode that elementary stream 204 based on its own decoding capabilities and/or the color values the display 104 can reproduce. The decoder 102 can make its determination based on the HDR flag 210 and/or WCG flag 212 associated with the elementary stream 204 in the program map table 202, without first devoting processing time and resources to decoding the elementary stream 204 before discovering whether or not it contains HDR/WCG content.

By way of a first non-limiting example, a decoder 102 can be configured to decode HDR/WCG content and be connected to an HDR/WCG display 106. In this example, the decoder 102 can review a program map table 202 and determine from an HDR flag 210 and/or WCG flag 212 whether or not the associated elementary stream 204 contains HDR/WCG content. If the flags indicate the presence of HDR/WCG content, it can select that elementary stream 204 and begin decoding it. If the flags do not indicate the presence of HDR/WCG content, it can either select that elementary stream 204 and begin decoding it or alternatively search for another HDR/WCG elementary stream 204.

By way of a second non-limiting example, a decoder 102 can be configured to decode HDR/WCG content but be connected to an SDR/SCG display 104 that is not configured to display HDR/WCG content. In this example, the decoder 102 can review a program map table 202 and determine from an HDR flag 210 and/or WCG flag 212 whether or not the associated elementary stream 204 contains HDR/WCG content. If the flags do not indicate the presence of HDR/WCG content, it can begin decoding the elementary stream 204.

In this example, in some embodiments when the HDR flag 210 and/or WCG flag 212 indicate the presence of HDR/WCG content in elementary stream 204, the decoder 102 can attempt to decode elementary stream 204 and convert the HDR/WCG values to SDR/SCG values that can be displayed by the SDR/SCG display 104. By way of a non-limiting example, the decoder 102 can attempt to use a color volume conversion operation to convert decoded HDR/WCG values into SDR/SCG values.

In alternate embodiments the decoder 102 can search for an alternate SDR/SCG elementary stream 204 when the HDR flag 210 and/or WCG flag 212 indicate the presence of HDR/WCG content in elementary stream 204. By way of a non-limiting example, the decoder 102 can look for an alternate elementary stream 204 for the program in the same program map table 202 that has flags that do not indicate the presence of HDR/WCG content. By way of another non-limiting example, the decoder 102 can look for an SDR/SCG elementary stream 204 in a different program map table 202 in the same transport stream 108, or it request an alternate transport stream 108.

By way of a third non-limiting example, a decoder 102 that has not been configured to decode HDR/WCG content can review a program map table 202 and determine from an HDR flag 210 and/or WCG flag 212 whether or not the associated elementary stream 204 contains HDR/WCG content. If the flags do not indicate the presence of HDR/WCG content, it can begin decoding the elementary stream 204. If the flags indicate the presence of HDR/WCG content, it can search for another SDR/SCG elementary stream 204 since it lacks the capability to decode an elementary stream 204 with HDR/WCG content. By way of a non-limiting example, a decoder's firmware may not have been updated to decode or process HDR/WCG color values.

Figure 3:
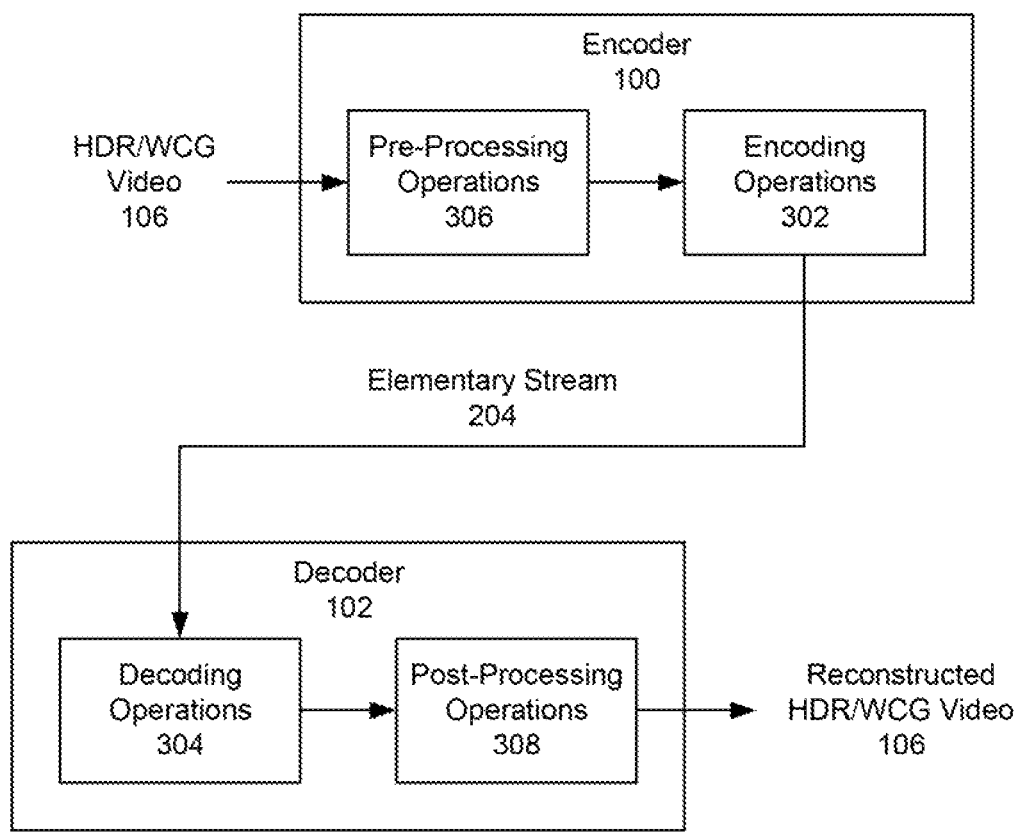
FIG. 3 depicts an embodiment of a system in which an elementary stream can be encoded with encoding operations and/or pre-processing operations at an encoder and decoded with decoding operations and/or post-processing operations at a decoder.

FIG. 3 depicts an embodiment of a system in which an elementary stream 204 can be encoded with encoding operations 302 at an encoder 100 and decoded with decoding operations 304 at a decoder 102. For SDR/SCG video, the elementary stream 204 can be encoded and decoded according to a desired coding format, such as a 10-bit HEVC profile known as a core HEVC codec. However, for HDR/WCG video, the encoder 100 can use on or more pre-processing operations 306 to convert the HDR/WCG content into a form that can be encoding using that desired coding format. By way of a non-limiting example, in some embodiments color values for HDR/WCG video 106 can be provided in a high bit depth format, such as an EXR file format with RGB color values expressed in a linear light RGB domain using a 16-bit floating point value for each color channel including a red channel, a green channel, and a blue channel. As such, the encoder 100 can convert the 16-bit values in HDR/WCG video 106 into 10-bit values that can be encoded using a 10-bit HEVC profile.

Pre-processing operations 306 can include transfer functions, color space conversions, bit depth reductions, chroma subsampling, and/or any other operation.

Transfer functions used during a pre-processing operation 306 can include non-linear transfer functions that can redistribute values on a linear scale to a non-linear curve. By way of a non-limiting example, a scene in an HDR/WCG video 106 in which most of the colors are similar, such as a dark scene set at night, can have most of its RGB values concentrated on the same portion of a large linear range. As such, the encoder 100 can use a non-linear transfer to redistribute those values on a non-linear curve, such that small differences between the colors can be more apparent than on the original linear scale.

Color space conversions used during a pre-processing operation 306 can include converting original or converted color values, such as converted non-linear values, into a different color space. By way of a non-limiting example, RGB values can be converted into a YCbCr color space in which a Y value represents a luma component, a Cb value represents a blue-difference chroma component, and a Cr value represents a red-difference chroma component.

Bit depth reductions used during a pre-processing operation 306 can include quantizing a high bit depth value into a lower bit depth value. By way of a non-limiting example, a 16-bit color value for HDR/WCG video can be quantized into one of a finite number of quantized 10-bit or 8-bit values separated by a quantization step size.

Chroma subsampling used during a pre-processing operation 306 can be a reduction in the amount of bits dedicated to the Cb and/or Cr chroma components. By way of a non-limiting example, HDR/WCG YCbCr values can have a 4:4:4 resolution in which the Y luma component, the Cb chroma component, and the Cr chroma component are described with the same number of bits. The encoder 100 can perform a chroma subsampling operation to convert 4:4:4 values to 4:2:0 values that decrease the number of samples devoted to the Cb and Cr chroma components, as the human eye is generally less sensitive to those components than to the Y luma component.

After performing any or all of these pre-processing operations 306, and/or other pre-processing operations 306, the encoder 100 can perform encoding operations 302 to encode the pre-processed data into a bitstream, such as an elementary stream 204 that can be included in the transport stream 108. The encoder 100 can follow encoding operations 302 for a desired encoding scheme, such as HEVC or AVC.

The encoder 100 can include in the elementary stream 204 information that indicates which pre-processing operations 306 it performed, and/or how pre-processing operations 306 were performed. By way of a non-limiting example, the encoder 100 can encode values used for the parameters of a parametrized non-linear transfer function in the elementary stream 204.

In some embodiments information about the pre-processing operations 306 used by the encoder 100 can be included in supplemental enhancement information (SEI) included in NAL units within the elementary stream 204. By way of a non-limiting example the elementary stream 204 can comprise a series of VCL (Video Coding Layer) NAL units that represent the bytes of encoded video data and non-VCL NAL units that indicate other information about how the video 106 was encoded, and SEI can be included in a non-VCL NAL unit within the elementary stream 204. In alternate embodiments, information about one or more of the pre-processing operations 306 can be included in other types of packets or NAL units within an elementary stream 204, such as a video parameter set (VPS), a sequence parameter set (SPS), or a picture parameter set (PPS). By way of a non-limiting example, information about one or more pre-processing operations can be included in video usability information (VUI) included in an SPS.

In some embodiments, information about pre-processing operations 306 can be included in different parts of the elementary stream 204. By way of a non-limiting example, information about transfer functions for HDR content can be signaled in SEI messages, while information about WCG content can be indicated in VUI.

The encoder 100 can prepare a transport stream 108 that comprises the encoded elementary stream 204 and a program map table 202 that includes an HDR flag 210 and/or WCG flag 212 that indicates the presence or absence of HDR/WCG content in the elementary stream 204. The transport stream 108 can be delivered to a decoder 102.

As shown in FIG. 3, when the encoder 100 performs pre-processing operations 306 to convert HDR/WCG video 106 into a form that can be encoded into an elementary stream 204 using a desired encoding scheme, a decoder 102 can perform decoding operations 304 to decode the elementary stream 204. However, because in this situation the encoder's pre-processing operations 306 converted the original HDR/WCG values in a particular manner prior to encoding them, corresponding post-processing operations 308 can be used to reverse the effects of the pre-processing operations 306 and substantially reconstruct the HDR/WCG video 106. Information in the elementary stream 204, such as the SEI or VUI described above, can indicate to a decoder 102 which pre-processing operations 306 were used and/or how to derive or perform corresponding post-processing operations 308 to reverse their effects.

Some decoders 102 can be configured to identify and perform the corresponding post-processing operations 308 that can be used to convert decoded values and reconstruct HDR/WCG video 106. However, other decoders 102 can lack the ability to identify and/or perform such post-processing operations 308. By way of a non-limiting example, a decoder's firmware may not have been updated to perform post-processing operations 308.

As such, when a program map table 202 that lists the elementary stream 204 includes an HDR flag 210 and/or WCG flag 212 that indicates the presence or absence of HDR/WCG content in the elementary stream, the decoder 102 can determine from those flags whether or not it is capable of decoding the elementary stream 204. When the flags in the program map table 202 do not indicate the presence of HDR/WCG content in an elementary stream 204, a decoder 102 can determine that it can use the decoding operations 304 to decode the elementary stream 204. When the flags program map table 202 do indicate the presence of HDR/WCG content in an elementary stream 204, a decoder 102 that has been configured to identify and perform post-processing operations 308 can choose to decode that elementary stream 204, while a decoder 102 that has not been configured to identify or perform post-processing operations 308 can choose to look for an alternate SDR/SCG elementary stream 204.

FIG. 4 depicts a non-limiting example of syntax for an HEVC video descriptor 400 comprising an HDR flag 210 and a WCG flag 212. An HEVC video descriptor 400 can be a descriptor included in a program map table 202 in a transport stream 108. By way of a non-limiting example, an HEVC video descriptor 400 can be an "HEVC descriptor" element included in an MPEG-2 transport stream along with other information such as an elementary stream identifier 206 and a stream type identifier 208.

For an HEVC elementary stream 204, the stream type identifier 208 can be a "stream type" field set to a value of 0x24 to indicate an HEVC base layer component. As decoders 102 can expect that a "stream type" value of 0x24 indicates an HEVC elementary stream that conforms to a 10-bit profile, that "stream type" value can indicate that conventional decoders 102 can decode the elementary stream 204. However, as described herein, in some situations post-processing steps may be used to reconstruct HDR/WCG values following decoding of a 10-bit profile HEVC elementary stream.

An HEVC video descriptor 400 can indicate attributes of an elementary stream 204 encoded with HEVC, including information by which decoders 102 can identify coding parameters such as profile and level parameters of the HEVC elementary stream 204. In some embodiments it can indicate attributes of an HEVC temporal video sub-bitstream or HEVC temporal video subset, such as the HEVC highest temporal sub-layer representation contained in the elementary stream 204. As shown in FIG. 4, an HEVC video descriptor 400 can comprise a plurality of fields.

The "profile_space," "tier_flag," "profile_idc," profile_compatibility_indication," "progressive_source_flag," "interlaced_source_flag," "non_packed_constraint_flag," "frame_only_constraint_flag," "reserved_zero_44 bits," and "level_idc" fields in the HEVC video descriptor 400 shown in FIG. 4 can be coded according to semantics defined in Recommendation ITU-T H.265 and ISO/IEC 23008□2, herein incorporated by reference.

When the HEVC video descriptor 400 describes an HEVC elementary stream 204 or an HEVC complete temporal representation, the "profile_space," "tier_flag," "profile_idc," profile_compatibility_indication," "progressive_source_flag," "interlaced_source_flag," "non_packed_constraint_flag," "frame_only_constraint_flag," "reserved_zero_44 bits," and "level_idc" fields can apply to the entire HEVC elementary stream 204 or an HEVC complete temporal representation, and these fields can be respectively coded according to semantics defined in Recommendation ITU-T H.265 and ISO/IEC 23008☐02 for general_profile_space, general_tier_flag, general_profile_idc, general_profile_compatibility_flag[i], general_progressive_source_flag, general_interlaced_source_flag, general_non_packed_constraint_flag, general_frame_only_constraint_flag, general_reserved_zero_44 bits, and general_level_idc.

Element general_profile_space specifies the context for the interpretation of general_profile_idc and general_profile_compatibility_flag[j] for all values of j in the range of 0 to 31, inclusive. The value of general_profile_space can be set to 0. Decoders 102 can ignore the coded video sequence when general_profile_space is not equal to 0.

Element general_tier_flag specifies the tier context for the interpretation of general_level_idc.

Element general_profile_idc, when general_profile_space is equal to 0, indicates a profile to which the coded video sequence conforms.

Element general_profile_compatibility_flag[j] equal to 1, when general_profile_space is equal to 0, indicates that the coded video sequence conforms to the profile indicated by general_profile_idc equal to j. When general_profile_space is equal to 0, general_profile_compatibility_flag[general_profile_idc] shall be equal to 1. The value of general_profile_compatibility_flag[j] shall be equal to 0 for any value of j that is not specified as an allowed value of general_profile_idc.

Elements general_progressive_source_flag and general_interlaced_source_flag are interpreted as follows. If general_progressive_source_flag is equal to 1 and general_interlaced_source_flag is equal to 0, the source scan type of the pictures in the coded video sequence should be interpreted as progressive only. Otherwise, if general_progressive_source_flag is equal to 0 and general_interlaced_source_flag is equal to 1, the source scan type of the pictures in the coded video sequence should be interpreted as interlaced only. Otherwise, if general_progressive_source_flag is equal to 0 and general_interlaced_source_flag is equal to 0, the source scan type of the pictures in the coded video sequence should be interpreted as unknown or unspecified. Otherwise, such as if general_progressive_source_flag is equal to 1 and general_interlaced_source_flag is equal to 1, the source scan type of each picture in the coded video sequence is indicated at the picture level using the syntax element source scan type in a picture timing SEI message. Decoders 102 can ignore the values of general_progressive_source_flag and general_interlaced_source_flag for purposes other than determining the value to be inferred for frame_field_info_present_flag when vui_parameters_present_flag is equal to 0, as there are no other decoding process requirements associated with the values of these flags.

Element general_non_packed_constraint_flag equal to 1 specifies that there are neither frame packing arrangement SEI messages nor segmented rectangular frame packing arrangement SEI messages present in the coded video sequence. general_non_packed_constraint_flag equal to 0 indicates that there may or may not be one or more frame packing arrangement SEI messages or segmented rectangular frame packing arrangement SEI messages present in the coded video sequence. Decoders 102 can ignore the value of general_non_packed_constraint_flag, as there are no decoding process requirements associated with the presence or interpretation of frame packing arrangement SEI messages or segmented rectangular frame packing arrangement SEI messages.

Element general_frame_only_constraint_flag equal to 1 specifies that element field_seq_flag is equal to 0. general_frame_only_constraint_flag equal to 0 indicates that field_seq_flag may or may not be equal to 0. Decoders 102 can ignore the value of general_frame_only_constraint_flag, as there are no decoding process requirements associated with the value of field_seq_flag.

Element general_reserved_zero_44 bits, when present, can be set to 0. Decoders 102 can ignore the value of general_reserved_zero_44 bits.

Element general_level_idc indicates a level to which the coded video sequence conforms. A greater value of general_level_idc indicates a higher level. The maximum level signaled in the video parameter set for a coded video sequence may be higher than the level signaled in the sequence parameter set for the same coded video sequence. When the coded video sequence conforms to multiple profiles, general_profile_idc should indicate the profile that provides the preferred decoded result or the preferred bitstream identification, as determined by the encoder 100.

When the HEVC video descriptor 400 describes an HEVC temporal video sub☐ bitstream or HEVC temporal video subset in which the HEVC highest temporal sub☐ layer representation is not an HEVC complete temporal representation, the "profile_space," "tier_flag," "profile_idc," profile_compatibility_indication," "progressive_source_flag," "interlaced_source_flag," "non_packed_constraint_flag," "frame_only_constraint_flag," "reserved_zero_44 bits," and "level_idc" fields can be respectively coded for the corresponding HEVC highest temporal sub☐ layer representation according to semantics defined in Recommendation ITU-T H.265 and ISO/IEC 23008☐2 for sub_layer_profile_space, sub_layer_tier_flag, sub_layer_profile_idc, sub_layer_profile_compatibility_flag[i], sub_layer_progressive_source_flag, sub_layer_interlaced_source_flag, sub_layer_non_packed_constraint_flag, sub_layer_frame_only_constraint_flag, sub_layer_reserved_zero_44 bits, and sub_layer_level_idc. These semantics can be the same respectively as those for general_profile_space, general_tier_flag, general_profile_idc, general_profile_compatibility_flag[i], general_progressive_source_flag, general_interlaced_source_flag, general_non_packed_constraint_flag, general_frame_only_constraint_flag, general_reserved_zero_44 bits, and general_level_idc, but apply to a sub-layer representation with a particular TemporalId. In these situations the fields can apply to the entire HEVC highest temporal sub☐ layer representation to which the HEVC video descriptor 400 is associated.

In one or more sequences in the HEVC video stream the level may be lower than the level signaled in the HEVC video descriptor 400, while also a profile may occur that is a subset of the profile signaled in the HEVC video descriptor 400. However, in the entire HEVC video stream, only subsets of the entire bitstream syntax shall be used that are included in the profile signaled in the HEVC video descriptor 400, if present. If the sequence parameter sets in an HEVC video stream signal different profiles, and no additional constraints are signaled, then the stream may need examination to determine which profile, if any, the entire stream conforms to. If an HEVC video descriptor 400 is to be associated with an HEVC video stream that does not conform to a single profile, then the HEVC video stream should be partitioned into two or more sub-streams, so that HEVC video descriptors 400 can signal a single profile for each such sub-stream.

The "temporal_layer_subset_flag" field in the HEVC video descriptor 400 shown in FIG. 4 can be a 1-bit field.

When set to 1, it can indicate that the HEVC descriptor 400 includes elements describing a subset of temporal layers. In some embodiments, "temporal_layer_subset_flag" can be set to 1 for HEVC temporal video subsets and for HEVC temporal video sub-bitstreams. When "temporal_layer_subset_flag" is set to 0, the elements "temporal_id_min" and "temporal_id_max" can be absent from the HEVC video descriptor 400.

The "HEVC_still_present_flag" field in the HEVC video descriptor 400 shown in FIG. 4 can be a 1-bit field. When set to 1, it can indicate that the HEVC video stream or HEVC highest temporal sub-layer representation can include HEVC still pictures. When set to 0, it can indicate that the HEVC video stream does not contain HEVC still pictures. Instantaneous decoding refresh (IDR) pictures can be associated with a TemporalId value equal to 0, and as such if the HEVC video descriptor 400 applies to an HEVC temporal video subset, HEVC still pictures can only be present in the associated HEVC temporal video sub-bitstream.

The "HEVC_24_hour_picture_present_flag" field in the HEVC video descriptor 400 shown in FIG. 4 can be a 1-bit field. When set to 1, it can indicate that the HEVC video stream or the HEVC highest temporal sub-layer representation can contain HEVC 24-hour pictures. When set to 0, it can indicate that the HEVC video stream does not contain HEVC 24-hour pictures.

The "sub_pic_hrd_params_not_present_flag" field in the HEVC video descriptor 400 shown in FIG. 4 can be a 1-bit field. When set to 0, it can indicate that VUI in the HEVC video stream has a "sub_pic_hrd_params_present_flag" syntax element set to 1. When set to 1, it can indicate that the HEVC stream lacks VUI with a "sub_pic_hrd_params_present_flag" syntax element, or that that element is set to 0.Decoders 102 that support a sub-picture processing mode can manage a transport stream system target decoder using delay values in the HEVC video stream specified in SEI messages, such as timing of decoding unit removal and decoding of decoding unit, instead of time stamp values in the PES header.

The "temporal_id_min" and "temporal_id_max" fields in the HEVC video descriptor 400 shown in FIG. 4 can both be 3-bit fields that respectively indicate the minimum and maximum "TemporalID," as defined in Recommendation ITU□T H.265 and ISO/IEC 23008□2, of all HEVC access units in the associated elementary stream 204.

As shown in FIG. 4, an HDR flag 210 can be a 1-bit "HDR_video_not_present_flag" field within the HEVC video descriptor 400, while a WCG flag 212 can be a 1-bit "WCG_video_not_present_flag" field within the HEVC video descriptor 400. In some embodiments, "WCG_video_not_present_flag" and "HDR_video_not_present_flag" can be inserted into an HEVC video descriptor 400 at a position held by reserved bits in prior versions of the HEVC video descriptor 400.

In this embodiment setting "HDR_video_not_present_flag" to 0 can indicate the presence of HDR values in the elementary stream 204, while setting "HDR_video_not_present_flag" to 1 does not indicate the presence of HDR values in the elementary stream 204. When the "profile_idc" field indicates a 10-bit profile, "HDR_video_not_present_flag" can be set to 0.

In this embodiment setting "WCG_video_not_present_flag" to 0 can indicate the presence of WCG values in the elementary stream 204, while setting "WCG_video_not_present_flag" to 1 does not indicate the presence of WCG values in the elementary stream 204. When the "profile_idc" field indicates a 10-bit profile, "WCG_video_not_present_flag" can be set to 0.

The Boolean values 0 and 1 discussed herein can also be understood to be respectively equivalent to "false" and "true" truth values. In some embodiments, any value other than 0 can be considered to be true.

Figure 5:
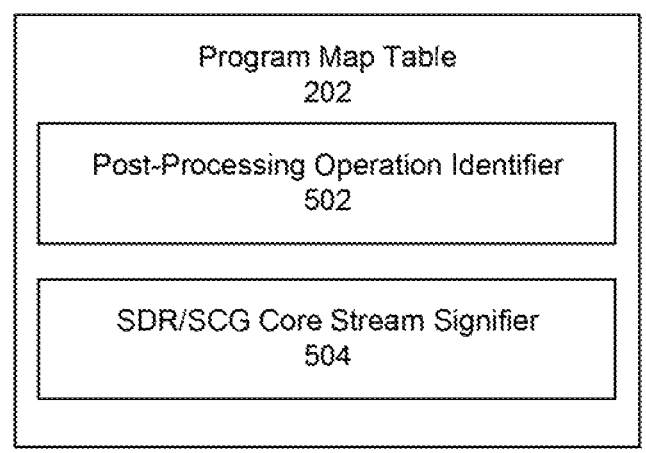
FIG. 5 depicts fields that can be present in some embodiments of a program map table.

FIG. 5 depicts fields that can be present in some alternate embodiments of a program map table 202, including one or more post-processing operation identifiers 502 and/or an SDR/SCG core stream signifier 504. In some embodiments, one or more of these fields can be present in a program map table 202 in addition to, or in place of, an HDR flag 210 and/or WCG flag 212.

In some embodiments, post-processing operation identifiers 502 can indicate which specific or which types of post-processing operations 308 a decoder 102 would need to perform to reconstruct a HDR/WCG video 106 from decoded values, and/or how to perform such post-processing operations. By way of a non-limiting example, post-processing operation identifiers 502 can be substantially similar to parameters or other information transmitted in SEI, VUI, or any other element inside an elementary stream 204 about pre-processing operations 306 and/or post-processing operations 308. As such, a decoder 102 can review post-processing operation identifiers 502 associated with an elementary stream 204 to determine whether it has been configured to perform the identified post-processing operations 308 before decoding the elementary stream 204.

In other embodiments, post-processing operation identifiers 502 can indicate post-processing operations 308 that a decoder 102 can use to convert HDR/WCG values to SDR/SCG values. By way of a non-limiting example, in some embodiments pre-processing operations 306 performed by the encoder 100 can identify transfer functions and/or other operations through which a decoder 102 can convert HDR/WCG values into SDR/SCG values. As such, some post-processing operation identifiers 502 can indicate these types of operations to a decoder 102 for an SDR/SCG display 104, such that the decoder 102 can decode HDR/WCG values from the elementary stream 204 and then use the identified operations to convert the decoded values to SDR/SCG values.

An SDR/SCG core stream signifier 504 can indicate whether or not values obtained from an elementary stream 204 through decoding operations 304 can be displayed on SDR/SCG displays without post-processing operations 308. In some situations an encoder's pre-processing operations 306 can convert an HDR/WCG video 106 into an SDR/SCG video 106, which the encoder 100 then encodes an elementary stream 204. By way of a non-limiting example, in some embodiments the encoder 100 can convert 16-bit HDR/WCG video 106 into 10-bit SDR/SCG video that can be encoded using a core HEVC codec with a 10-bit profile. As such, in these situations a decoder 102 for an SDR/SCG display 104 can use values decoded from the elementary stream 204 to display reconstructed SDR/SCG video 106, while a decoder 102 for an HDR/WCG display 104 can perform post-processing operations 308 on decoded SDR/SCG values to convert the values into HDR/WCG values and substantially reconstruct the original HDR/WCG video 106.

In some situations an HDR flag 210 and WCG flag 212 can indicate the presence of HDR/WCG content in an elementary stream 204, but an SDR/SCG core stream signifier 504 can indicate that the values expected to be obtained by decoding operations 304 are suitable for display as SDR/SCG video 106. In these situations a decoder 102 for an SDR/SCG display 104 can select an HDR/WCG elementary stream 204 when an SDR/SCG core stream signifier 504 indicates that the decoded elementary stream 204 can be presented as SDR/SCG video 106 without post-processing operations 308.

Alternatively, an SDR/SCG core stream signifier 504 can indicate that the values expected to be obtained by decoding operations 304 would not be appropriate for presentation on an SDR/SCG display 104 without post-processing operations 308. By way of a non-limiting example, in some situations the encoder's pre-processing operations 306 can have converted HDR/WCG values into a form that can be better encoded into an elementary stream 204, but that made changes to the values that the encoder 100 expected decoders 102 to reverse with post-processing operations 308. As such, an SDR/SCG core stream signifier 504 can indicate that the intermediate encoded values are not appropriate for display without post-processing operations 308.

Although the present invention has been described above with particularity, this was merely to teach one of ordinary skill in the art how to make and use the invention. Many additional modifications will fall within the scope of the invention, as that scope is defined by the following claims.

The invention claimed is:

1. An apparatus including a processor receiving a transport stream, the apparatus comprising:
  (a) said transport stream including a program map table;
  (b) an elementary stream identifier indicating a particular elementary stream within said transport stream;
  (c) a High Efficiency Video Coding (HEVC) video descriptor signaling a syntax element using two bits for combining signaling of a presence or absence of both a high dynamic range (HDR) content and a wide color gamut (WCG) content in a single syntax element;
  (d) wherein said high dynamic range content and/or said wide color gamut content is associated with an elementary stream based on said elementary stream identifier signaled in said program map table.

2. The apparatus of claim 1, wherein said syntax element signals both the presence or absence of HDR and/or WCG using two bits.

3. The apparatus of claim 2, wherein said HEVC video descriptor is included in a bitstream encoded with HEVC.

4. The apparatus of claim 1, wherein the program map table further comprises a stream type identifier indicating an encoding scheme used to encode said elementary stream.

5. The apparatus of claim 4, wherein said stream type identifier is set to "0x24" to indicate that said elementary stream is a bitstream encoded with High Efficiency Video Coding (HEVC).

6. The apparatus of claim 1, wherein the program map table further comprises one or more post-processing operation identifiers associated with said elementary stream, wherein said post-processing operation identifiers indicate post-processing operations that can operate on values decoded from said elementary stream to substantially reverse pre-processing operations performed by an encoder that encoded said elementary stream.

7. The apparatus of claim 1, wherein the program map table further comprises a standard dynamic range and/or standard color gamut core stream signifier that indicates whether values decoded from said elementary stream can be displayed on a standard dynamic range and/or standard color gamut display without post-processing operations that convert the values to a high dynamic range and/or wide color gamut.

8. A method of decoding a video, comprising:
  receiving by a decoder a transport stream including a program map table and an associated elementary stream;
  receiving by said decoder a High Efficiency Video Coding (HEVC) video descriptor signaling a syntax element signaled in a single syntax element using two bits for combining signaling of a presence or absence of both a high dynamic range (HDR) content and a wide color gamut (WCG) content; and
  decoding said elementary stream, in the case that said single syntax element indicates said presence of at least one of said HDR content and said WCG content, wherein said high dynamic range content and/or said wide color gamut content is associated with said elementary stream based on said elementary stream identifier signaled in said program map table.

9. The method of claim 8, further comprising performing at said decoder one or more post-processing operations on values decoded from said elementary stream to reconstruct high dynamic range and wide color gamut content.

10. The method of claim 9, wherein said one or more post-processing operations are identified by supplemental enhancement information within said elementary stream.

11. The method of claim 9, wherein said one or more post-processing operations are identified by video usability information within said elementary stream.

* * * * *

UNITED STATES PATENT AND TRADEMARK OFFICE
CERTIFICATE OF CORRECTION

PATENT NO. : 10,869,053 B2
APPLICATION NO. : 16/548832
DATED : December 15, 2020
INVENTOR(S) : Mandayam Narasimhan and Ajay Luthra It is certified that error appears in the above-identified patent and that said Letters Patent is hereby corrected as shown below:

In the Specification

Column 3, Line 6: Replace "interne" with --internet--

Column 6, Line 16: Replace "elementary PID" with --elementary_PID--

Column 6, Line 27: Replace "stream type" with --stream_type--

Column 10, Line 31: Replace "stream type" with --stream_type--

Column 10, Line 33: Replace "stream type" with --stream_type--

Column 10, Line 35: Replace "stream type" with --stream_type--

Column 13, Line 35: Insert a space between "0." and "Decoders"

Signed and Sealed this
Twenty-first Day of May, 2024

Katherine Kelly Vidal
*Director of the United States Patent and Trademark Office*